June 18, 1968  L. JENSEN  3,388,741
METHODS FOR DRILL STEM TESTING
Original Filed June 21, 1965
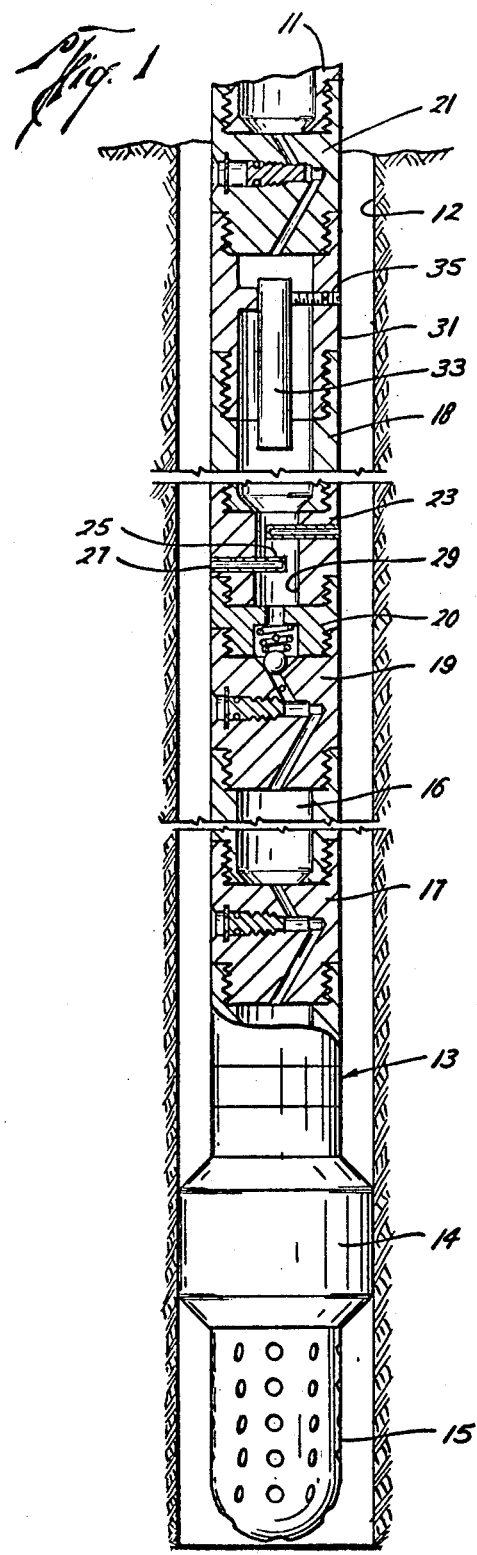
Lloyd I. Jensen
INVENTOR.
BY David L. Moseley
ATTORNEY

United States Patent Office 3,388,741
Patented June 18, 1968

3,388,741
METHODS FOR DRILL STEM TESTING
Lloyd Jensen, Calgary, Alberta, Canada, assignor, by mesne assignments, to Schlumberger Technology Corporation, New York, N.Y., a corporation of Texas
Original application June 21, 1965, Ser. No. 465,482, now Patent No. 3,351,135, dated Nov. 7, 1967. Divided and this application July 5, 1967, Ser. No. 660,852
3 Claims. (Cl. 166—3)

ABSTRACT OF THE DISCLOSURE

The particular method described herein as illustrative of one mode of the invention, utilizes, in a closed chamber testing technique, upper and lower sample receiving chambers separated by a one-way check valve for permitting the flow of formation fluids from a test valve upwardly through the lower sample chamber and check valve into the upper sample chamber while preventing flow in the opposite direction. Valves having external control means are positioned at the upper end of the upper chamber and the lower end of the lower chamber and adapted to permit the removal of fluids therefrom into a closed receptacle. A reversing valve in the upper chamber is operated by a drop bar located within the upper chamber.

---

This is a division of application Ser. No. 465,482, filed June 21, 1965, now Patent No. 3,351,135.

This invention relates to formation testing and, more particularly, to methods for obtaining recovery of fluid samples from a well bore.

During the drilling of a well, the operator may at some time desire to test a section of the well for production potential. To do this, a testing tool having a normally closed tester valve and a packer means is inserted into the well at the lower end of a string of pipe or tubing. The packer means is disposed at a location just above the section to be tested and expanded to close off the bore of the well. Thus, the section for test is isolated from the control fluid which is usually mud. The testing tool includes a pressure recorder which measures the initial pressure of the isolated section to obtain what is referred to as an initial shut-in pressure. The tester valve is then opened and formation fluid flow into the string of tubing. The flow may appear at the surface if the pressures are great enough. Pressure is recorded during the flow period. The tester valve is then closed and a final shut-in pressure recorded.

When the string of tubing is brought to the surface and sections of tubing and tools are removed from the string of tubing, the formation fluids in the tubing are exposed at the surface or floor of the drilling platform. Such exposure of formation fluids may be undesirable under certain circumstances for reasons of safety or secrecy.

The present invention is directed to methods for use during the testing operation to prevent uncontrolled flow of formation fluids at the surface. At the same time, formation fluids are contained to prevent escape at the earth's surface and may be maintained in closed containers so that the results of the test are confidential.

Additionally, it is often undesirable to test wells at night since it is necessary to keep electrical equipment running in order to provide light. The presence of such electrical power at the well head may present a hazard if flammable formation fluids and gases are exposed at the surface during testing operations.

Accordingly, it is an object of the present invention to provide new and improved methods for conducting drill stem tests.

Another object of the present invention is to provide a new and improved method for conducting drill stem tests wherein the results of the test are confined between closed ends of drill pipe and drained therefrom at the surface into convenient receptacles.

Still another object of the present invention is to provide a new and improved method for conducting drill stem tests which permits a formation to flow for a period sufficient to clean the formation of contamination and takes a sample of the last flowing fluids, all the recovered fluids being maintained in a closed system throughout the testing operation.

Therefore, in accordance with the present invention, in a drill stem test, the fluid recovery is limited to given sections of the drill pipe which are closed off prior to retrieving the sections at the earth's surface. The fluid recovery enters the sections of pipe through a first chamber and flows into a second chamber which, being comprised of sections of drill pipe, may be of any desired length. Means are provided between the chambers to prevent fluids from flowing back from the second chamber into the first chamber. After fluids have filled the two chambers, the test valve is closed and the string of tools is retrieved to the surface. Means are provided for reversing the fluids out of the upper chamber into a convenient receptacle. The lower chamber which contains an uncontaminated sample of the formation fluids may then be separated from the string of tools and removed from the well site for examination or the chamber may be drained into a receptacle at the well head.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings in which:

FIG. 1 illustrates a string of tools in a well bore for practicing the present invention;

FIG. 2 illustrates a view in cross section of apparatus embodied in the present invention; and FIG. 3 is a view taken along line 3—3 of FIG. 2.

FIGURE 1 illustrates apparatus embodying the invention where a drill or tubing string 11 is lowered from the surface of the earth into a well bore 12. At the lower end of the drill string 11 is a conventional testing tool string 13 such as the type illustrated and described in U.S. Patent No. 2,901,001. The usual drill stem testing tool string 13 includes a flow tube with a normally closed valve (not shown) and a packer element 14. The packer element 14, when actuated as shown, expands into sealing engagement with the borehole wall. After the tester valve is opened, fluid flows from below the packer 14 through its flow tube and into the tubing string. Pressure recorders (not shown) in the tool string 13 measure and record pressure. As shown in FIG. 1, a perforated anchor 15, for admitting well fluid to the flow tube is also used for engaging the bottom of the well bore for expanding the packer in a conventional manner.

It will be appreciated that hook-wall packers (not shown), which can be set without a bottom hole anchor, could be employed rather than the type described.

In the present invention, an isolation sub 17 couples the lower end of a first section of drill pipe 16 to the tester tool string 13 and a similar isolation sub 19 is coupled to the upper end of pipe 16. Subs 17 and 19 have passage and valve means to permit fluid flow therethrough. The valve means of sub 17 and 19 when closed, as will hereinafter be more fully explained, serve to contain formation fluids within the chamber formed by the section of drill pipe 16. Coupled to sub 19 are check valve sub 20 and a reverse circulation valve sub 23. A second section of drill pipe 18 is coupled to valve sub 23 to form a second chamber. For reasons to be hereinafter described, the second section of pipe 18 is normally comprised of more than one joint of pipe. The check valve sub 20 permits a flow of fluid from sub 19 into the pipe 18 but prevents return flow. The reverse circulation valve sub 23 provided between the lower end of pipe 18 and check valve 20 has hollow knock-out plugs 25 which seal off ports 27 in the outer wall of the sub. Plugs 25 are constructed so that a weighted member dropped thereon will break the plugs and open an interior bore 29 of the sub to fluid communication with the well bore through ports 27.

A bar holder sub 31 is coupled to the upper end of pipe 18. An isolation sub 21 similar to subs 17 and 19 couples sub 31 to the string of pipe 11. The sub 31 releasably supports a bar 33 by means of a pin 35 which pin is operable from the exterior of the sub 31 to release the bar 33. Release of the bar 33 permits the bar to drop to the lower end of the chamber and into bore 29 in sub 23 to break the plugs 25 thus opening ports 27. The top of the sub 20 which houses the valve also serves as a bar stop for the falling bar 33.

FIGURE 2 is a detailed view of the isolation subs 17, 19 and 21. These subs include threaded box and pin ends 37 and 39 for connection in a string of tubing. Each sub has a flow passage 41 extending longitudinally through the sub and a valve 43 for opening and closing the passage 41. Valve 43, shown in FIG. 2 in its open position, has a body portion 45 threadedly received in a valve bore 47 and has a tapered valve portion 49 provided with O rings. When the valve body 45 is rotated in one direction, the valve portion 49 seats in a valve seat 51 to block or close off the fluid passageway 41. Rotation of the valve body 45 is accomplished by means of a wrench or the like applied to the body 45 through a cylinder bore 53 opening to the exterior. Thus, the valve has a control portion exposed to the exterior of the sub. The body portion 45 of a valve 43 is provided with an O ring to seal within the cylinder bore 53. A snap ring 55 received in a snap ring groove prevents the valve body from leaving the valve bore 53.

The isolation subs are also provided with another valve 56 (FIG. 3) which controls fluid flow to a passageway 57 in fluid communication with an opening to the longitudinal passageway 41. The valve 56 which is normally closed, includes a body 59 threadedly received in a bore 61 with a valve element 63 having O rings providing a seal with a valve seat 65 in the sub. The valve body 59 similarly is provided with an O ring 67 and snap ring retainer 69 and similarly is controlled from the exterior of the sub. Another transverse passage 71 opens midway of the valve body 59 and has a threaded end portion 73 exposed to the exterior of the sub. When the valve 56 is opened, as by unthreading of the valve body, the opening defined by portion 73 and the transverse bore 57 are placed in fluid communication.

In operation, the test tool string 13 is lowered into the well bore, at the end of a string of tubing or pipe, the test valve of the tool string 13 being closed. Above the tool string 13 are pipe sections 16 and 18 with isolation subs secured to the ends of the sections and one way check valve 20 positioned between the sections. Valves 43 in isolation subs 17 and 19 are open while the valve 43 in sub 21 is closed.

At the level where the test is desired, the packer is actuated into sealing engagement with the well bore and the test valve of tool string 13 is opened permitting formation fluids from formations isolated below the packer to flow into the perforated anchor and thence into the pipe section 16 through the open valve 43 in sub 17. After filling the pipe section 16, the fluid flows through the open valve 43 in sub 19 and through the one way check valve 20 into pipe section 18.

The uppermost isolation sub 21 is normally closed to prevent the fluid from filling the tubing above this point. However, it is readily seen that any amount of pipe may be included within the section defining pipe section 18, the amount depending upon the duration of the formation test. It may be desirable to take several shut in tests on the formation with intermediate flow periods. At the end of the final flow period, the formation fluids flowing through the lower or first pipe section 16 will be the last fluids produced from the formation. Therefore, when the test valve of the tool string 13 is closed, thus closing off the lower end of the pipe section 16, the sample of fluid trapped in the section 16 will represent the last fluid to flow from the formation. This provides a sample which should be least contaminated by drilling fluids and, therefore, a sample most representative of the formation fluid.

When the test is completed, the packer 14 is disengaged from the well bore and the string of tools is retrieved to the surface. When sub 21 reaches the surface, the retrieval of the tool string from the well is temporarily halted. One end of a flow line or transfer head (not shown) is connected to the opening 73 in the sub 21. The other end of the flow line is placed within a closed receptacle or in a pit disposed a safe distance from the upper end of the well. The valves 43 and 56 in the sub 21 are then opened to place the opening 73 and flow line in communication with the longitudinal passage 41 through the sub. The opening of the valves in sub 21 permits gas pressure in pipe sections 16 and 18 to be bled off. This bleed off of gas may be measured by a positive displacement meter to determine the amount of gas in the formation fluid. The transfer head may alternatively be connected to the box end 37 of the sub in which event valve 43 would only be opened to place the transfer head in communication with the passage 41. Next, the pin 35 is removed from the bar 33 to release the bar. Upon dropping to the lower end of the chamber 18, the bar 33 is effective to shear the plugs 25 and open the ports 27 in the reversing tool 23. Blowout preventers, at the well head (not shown), are then closed and pump pressure is applied to the well fluid or drilling mud in the well bore annulus to pump the fluid into the ports 27 and thereby force the formation fluid out of section 18 through the now opened upper isolation sub 21 and flow line into the receptacle or pit. This pumping of the well fluid is continued until the fluid emerging from the flow line is free of formation fluid. Pumping is then ceased and the flow line is disconnected from the sub 21. Thereafter, as the tool string is further retrieved from the well and the sections of pipe comprising the pipe section 18 are removed from the string, no flammable formation fluids will be exposed on the derrick floor to cause a fire hazard. Furthermore, as the pipe is raised, mud or well fluid in the pipe will drain out through the ports 27 into the annular space in the well.

When the reversing sub 23, check valve 20, and isolation sub 19 are brought to the surface, the retrieval of the tool string is once again halted. The valve 43 in sub 19 is closed to prevent fluid or gas in section 16 from escaping. Subs 23 and the check valve 20 are removed from the string of tools. A flow line or transfer head is connected to fitting 73 in the isolation sub 19. The valves 43 and 56 in sub 19 are then opened to bleed off any pressure in the chamber 16. Valves 43 and 56 are closed and the flow line is disconnected.

The tool string is then pulled up until isolation sub 17 is positioned at the surface. The valve 43 in sub 17 is then closed. The closed section 16 may then be removed from the tool string for transportation away from the well head for inspection or, if desirable, a transfer head or flow line may be attached to the fitting 73 in sub 17, and upon opening of valves 43 and 56, the contents of section 16 may be drained therefrom into a suitable receptacle.

It will be appreciated from the description above that drill stem testing by this method will minimize any hazard of fire when testing with electrical power equipment operating on the derrick floor such as is necessary at night. Furthermore, by controlling the exposure of formation fluids at the well site, it is possible to maintain the results of the test confidential.

While a particular embodiment of the present invention has been shown and described, it is apparent that changes and modifications may be made without departing from this invention in its broader aspects and, therefore, the aim in the apended claims is to cover all such changes and modifications as fall within the true spirit and scope of this invention.

What is claimed is:

1. A method of testing a well bore containing a well fluid comprising the steps of: in a well bore, opening a string of tools to permit the flow of fluid from isolated earth formations through first and second chambers in the string of tools where said first and second chambers are separated by a one way valve means preventing flow of fluids from the second chamber to the first chamber; retrieving the string of tools and at the earth's surface, connecting one end of said second chamber to a discharge receptacle, opening a reversing port in the opposite end of said second chamber, passing fluid through the reversing port to remove formation fluids from the second chamber, and closing off the ends of said first chamber to trap a fluid sample in said first chamber for subsequent analysis.

2. A method of testing a well bore containing a well fluid comprising the steps of: in a well bore, opening a string of tools to permit the flow of fluid from isolated earth formations through first and second chambers in the string of tools where said first and second chambers are separated by a one way valve means preventing flow of fluids from the second chamber to the first chamber, retrieving the string of tools and at the earth's surface, connecting one end of the second chamber to a discharge receptacle, opening a reversing port in the opposite end of the second chamber, passing fluid through the reversing port to remove formation fluids from the second chamber, connecting one end of the first chamber to a discharge receptacle, and draining the fluid from the first chamber into such receptacle.

3. A method of testing a well bore containing a well fluid comprising the steps of: in a well bore, opening a test valve in a string of tools to permit the flow of fluid from isolated earth formations through the test valve into first and second chambers in the string of tools where the first and second chambers are separated by a one way valve means preventing flow of fluids from the second chamber to the first chamber, retrieving the string of tools, and at the earth's surface, connecting a flow line to a valve in one end of the second chamber, releasing pressure within the first and second chambers through the valve in the one end of the second chamber, opening a reversing port in the opposite end of the second chamber, passing fluid through the reversing port to remove formation fluid from the second chamber, separating the second chamber from the string of tools, and closing off the ends of the first chamber so that a fluid sample is isolated within the first chamber for subsequent analysis.

References Cited

UNITED STATES PATENTS

| | | | |
|---|---|---|---|
| 2,176,240 | 10/1939 | Bandy | 166—164 |
| 2,645,288 | 7/1953 | Deters et al. | 166—149 |
| 2,903,074 | 9/1959 | Layton et al. | 166—224 |
| 3,038,539 | 6/1962 | Bloom et al. | 166—3 |
| 3,254,710 | 6/1966 | Jensen | 166—224 X |

DAVID H. BROWN, *Primary Examiner.*